Figure 6:
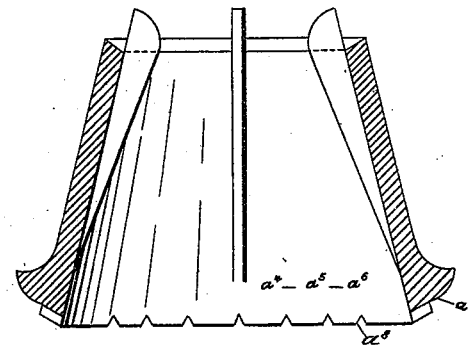

(No Model.) 3 Sheets—Sheet 1.

R. G. WARD.
WATER HEATER.

No. 421,792. Patented Feb. 18, 1890.

WITNESSES:
INVENTOR
ATTORNEY (No Model.) 3 Sheets—Sheet 2.

R. G. WARD.
WATER HEATER.

No. 421,792. Patented Feb. 18, 1890.

WITNESSES: A. W. Davis, F. L. McAvy

INVENTOR R. G. Ward
BY E. B. Stocking
ATTORNEY (No Model.) 3 Sheets—Sheet 3.
R. G. WARD.
WATER HEATER.
No. 421,792. Patented Feb. 18, 1890.
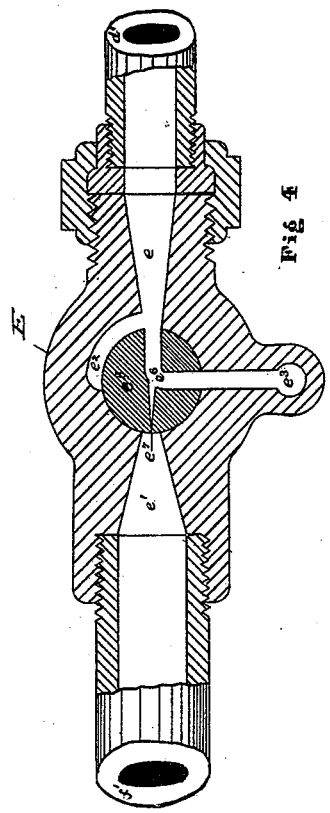
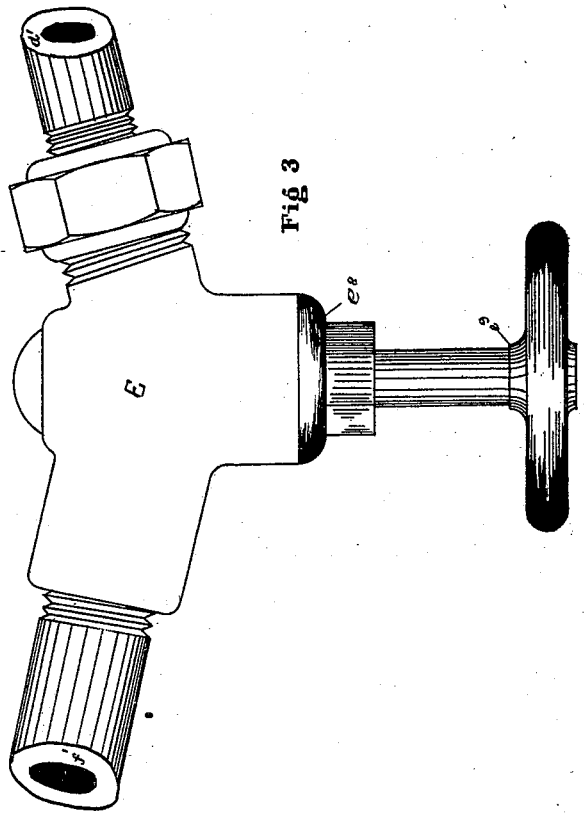
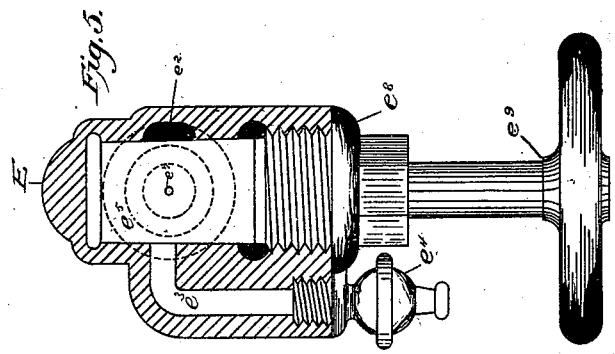
WITNESSES:
A. W. Davis
F. L. McAvoy.
R. G. Ward
INVENTOR
BY E. B. Stocking
ATTORNEY

UNITED STATES PATENT OFFICE.

RANDOLPH G. WARD, OF BALTIMORE, MARYLAND.

WATER-HEATER.

SPECIFICATION forming part of Letters Patent No. 421,792, dated February 18, 1890.

Application filed June 22, 1889. Serial No. 315,246. (No model.)

*To all whom it may concern:*

Be it known that I, RANDOLPH G. WARD, residing at Baltimore, in the State of Maryland, have invented certain new and useful Improvements in Water-Heating and Steam-Generating and Flushing Apparatus for Cleaning Pipes and Tubes, especially such as are used for drawing or conducting beer and other beverages from the cask or barrel to the counter-faucet, of which the following is a clear and sufficient specification, reference being had to the accompanying three sheets of drawings illustrating the same.

It is a well-known fact that in the pipes, tubes, or "coils" used in drawing beer and other fluids from the cask there is a sedimentary deposit of dregs and other filthy and injurious elements in such pipes or tubes which finally obstruct the flow of the liquids, and various chemical substances have been resorted to to clean the pipes or tubes by reducing this sediment to solution and passing it off with a flow of water. It is also well known that in many cities of Europe traveling boilers upon the streets furnish steam through hose or other elastic connection with the liquor pipes or tubes, which disengages the sedimentary deposits from the inner walls of the same, and that after being thus disengaged it is passed out by a flow of hot water from the boiler, which effectually cleans the pipes, and which are then cooled by passing a flow of cold water through them, placing them again in condition for service. This street system, while efficient, is expensive, cumbersome, and begets a feeling of dependence on the part of the owners of the pipes toward the owner of the steam cleaning and washing boiler.

The purpose and object of my invention, therefore, are to furnish a small, compact, cheap, and at the same time efficient water-heating and steam-generating apparatus which, in connection with the ordinary flow of water in city pipes, shall furnish at great convenience and small cost all the requisites of this well-known and most efficient system of pipe and tube cleaning—viz., steam and hot and cold water—and the particular features in my machine or device are such that no skill is required to operate it, and that it is adaptable to any size or length of coil pipe or tube ordinarily used in saloons without increasing its size, and is easily attached to the water and gas pipes, which is used as fuel, and is then ready to connect with such pipes as may need cleaning.

The purpose and object of my invention, therefore, are to enable each owner to clean his own pipes thoroughly and economically, and I accomplish this with the following illustrated apparatus, in all the figures of which like letters refer to like parts.

Figure 7:
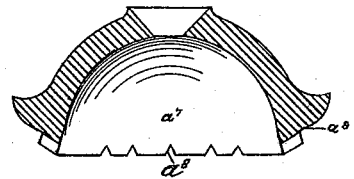
Figure 1:
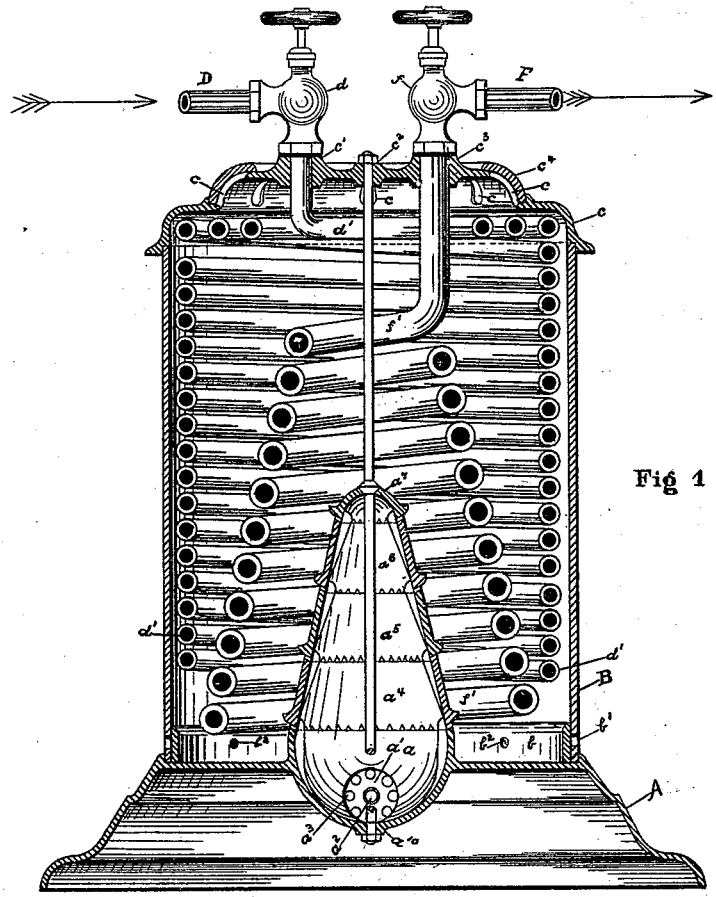
Figure 8:
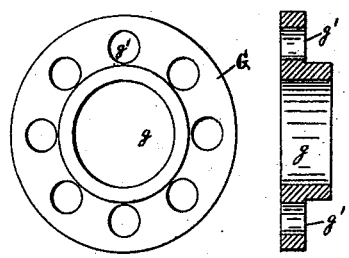
Figure 2:
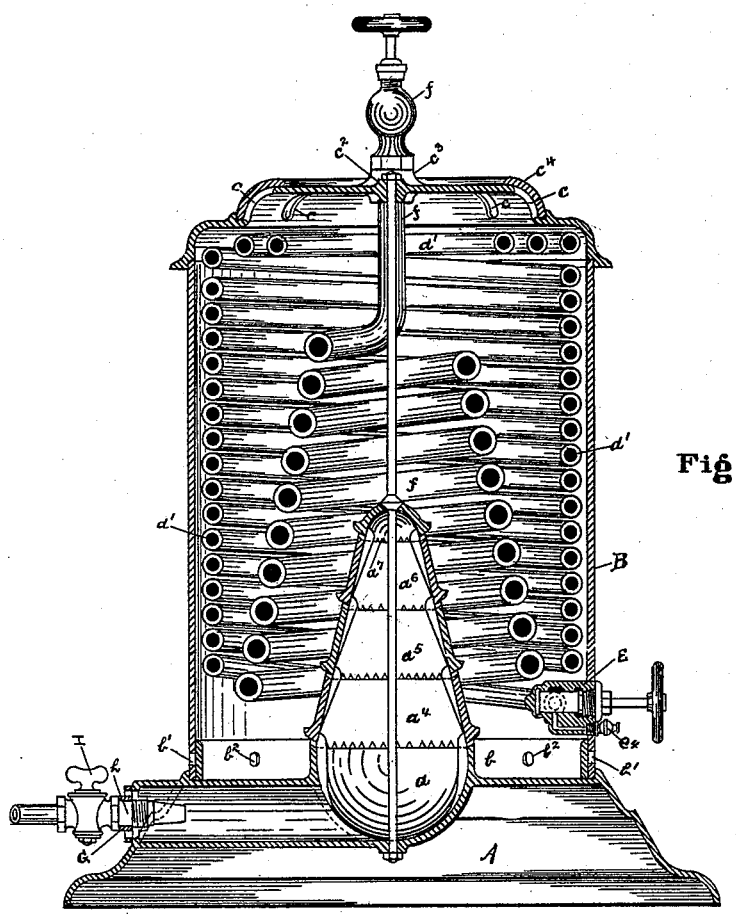

Figure 1 is a section taken vertically through my device. Fig. 2 is a section taken upon lines at right angles to Fig. 1. Fig. 3 is a plan of the combination spray-cock, showing its connection with the lower ends of the water and steam coils, (enlarged.) Fig. 4 is a section through the same, taken in the line of the pipes and a vertical plane, (enlarged.) Fig. 5 is a section through the same, taken upon the lines of Fig. 2, (enlarged.) Fig. 6 is a section of burner, such as is intended for gas, (enlarged.) Fig. 7 is also a section of burner, and shows the form of tap, (enlarged.) Fig. 8 is a plan and section of the Bunsen air-regulator, (enlarged.)

In describing my invention, A is an annular conical-formed base centrally provided with the basin-shaped burner-base $a$, core $a'$, gas-inlet $a^2$, and air-inlets $a^3$, also section built-up burner, as $a^4$ $a^5$ $a^6$, and cap $a^7$, (any of the sections may be a cap, if the heat produced is sufficient,) and all are provided with the escape-holes $a^8$ and the flame-deflectors $a^9$.

$a^{10}$ is a boss centrally located to accommodate the binding-bolt.

B is a barrel-shaped case or body resting upon the base A and provided with an inner draft-regulator $b$, which, by bringing the vent-holes $b^2$ into position with those $b'$ of B, can increase or diminish it at will.

C is a cap-plate resting upon B, and is provided with escape or ventilating drafts $c$, bosses $c'$, $c^2$, and $c^3$ for the water-pipe, binding-rod, and steam-pipe, and a regulating-plate $c^4$, which can be made to slide over the draft-holes $c$.

D is the water-inlet pipe connected with the supply; $d$, the regulating-valve; $d'$, the water-heating coils situated within and near the inner walls of the case B.

E is a combination stop-flow jet and drain-valve, connecting the lower end of the downwardly-coiled water-heating pipe $d'$ with the lower end of the upwardly-coiled steam-generating pipe $f'$, in which $e$ is the supply or water port, and $e'$ the exhaust or steam port, $e^2$ the auxiliary-flow core, $e^3$ the drain-core, and $e^4$ the petcock, $e^5$ the plug provided with an angle-core $e^6$, (the position shown for draining the water-pipe if the pet-cock is open, and if closed of jetting a small stream of water into the pipe $f'$ through the jet-core $e^7$,) and it is evident that by turning this angle-core $e^6$ the pipe $f'$ may be drained into the core $e^3$ or supplied with a flow from the core $e^2$.

$e^8$ is a binding-plug; $e^9$, the operating lever and wheel; $e^{10}$, the pet or drip cock.

F is the exhaust or steam pipe connected with the pipes or tubes to be cleaned. $f$ is a valve; $f'$, the steam-generating coil, connected at its lower end with the valve or cock E and the water-heating coil $e'$.

G is the air-regulator, having the core $g$ and the air-ports $g'$, corresponding to the gas-supply pipe H at $h$ and the air-ports $a^3$ of the core $a'$.

The operation of my device is as follows: The connections are made with the supply of water and gas and also with the tubes to be cleaned, the valve E is closed, and the gas then turned on and lighted. Water is then passed into the coil $d'$ through the valve $d$ and allowed to heat until the coil $f'$ is hot enough to generate steam. The valve E is then turned into the position shown in Fig. 4, and a small jet of hot water is thrown from the coil $d'$ to the coil $f'$ and instantly converted into steam, which passes through the valve $f$ and the pipe F through the pipes or tubes to be cleaned. Should, however, these pipes or tubes be of extraordinary length or very much obstructed, a momentary closing of the valve $f$ will accumulate steam and force enough to accomplish the cleaning. Then by again turning the valve E a flow of hot water is passed through, thoroughly washing out the impurities liberated by the steam, and then by turning off the gas the flow of water gradually becomes cold, and thus places the pipes in a condition for immediate use.

It will be observed that the body of the valve E is merely passed through an opening in the shell B without any water, air, or steam tight fit, these being unnecessary, and that by simply removing the plug of the valve E the petcock body of the valve can be moved inwardly, so as to be entirely inside of the shell. Now by simply removing the nut at the upper end of the binding-rod the cap and coils may be lifted bodily away from and out of the shell for the purpose of cleaning or repair.

What I claim is—

1. In an apparatus of the class described, the combination of a burner, two coils, and a valve connected with each of the coils at their lower ends, substantially as specified.

2. In an apparatus of the class described, the combination of a burner, two coils, and a valve connected with each of the coils at their lower ends, said valve being provided with a draining-passage, substantially as specified.

3. In an apparatus of the class described, a burner, two coils, and a valve connecting the coils at their lower ends, said valve having an angular core and a communicating jet-core, substantially as specified.

4. In an apparatus of the class described, a burner, two coils, an angular-cored valve connecting the coils at their lower ends, and valves connected with the upper end of each coil, substantially as specified.

5. In an apparatus of the class described, a valve adapted for connecting two coils and provided with a plug having an angular core, port, or passage, and a communicating jet-core, said valve being also provided with an auxiliary core, port, or passage, as $e^2$, and a drain-passage, as $e^3$, substantially as specified.

6. In an apparatus of the class described, a water-heating coil provided with a supply-controlling valve at its upper end and connected with a jet-valve at its lower end, and a steam-generating coil connected at its lower end with said jet-valve, substantially as specified.

7. In an apparatus of the class described, the combination of a water-heating coil, a steam-generating coil, and a jet and supply valve connecting the two coils at their lower ends, substantially as specified.

8. In an apparatus of the class described, a water-heating coil, a steam-generating coil, a combined jet-supply valve connecting said coils at their lower ends, and a controlling-valve connected with the upper end of the steam-generating coil, substantially as specified.

9. In an apparatus of the class described, a shell provided with an opening, a cap for the shell-coils, the upper ends of which are seated in the cap and the lower ends of which are connected at their lower ends by a valve adapted to enter the first-mentioned opening, and a binding-rod for securing the cap in position on the shell, substantially as specified.

10. In an apparatus of the class described, a water-heating coil connected at its upper end with a water-supply and provided at its lower end with a jet-supply valve, in combination with an interiorly-arranged steam-generating coil connected at its lower end with said jet and supply valve, and a centrally-arranged burner or heating device, whereby water may be first heated and then injected into the steam-generating coil, substantially as specified.

11. In an apparatus of the class described, a water-heating coil connected at its upper end with a supply and at its lower end with a steam-generating coil by a combined jet and supply valve, in combination with a controlling-valve connected with the upper end of said steam-generating coil, whereby an increased steam-pressure may be temporarily produced within the steam-generating coil, substantially as specified.

In testimony whereof I affix my signature in presence of two witnesses.

RANDOLPH G. WARD.

Witnesses:
WM. A. EASTERDAY,
HEATH SUTHERLAND.